(12) United States Patent
Wanveer et al.

(10) Patent No.: US 7,131,400 B2
(45) Date of Patent: Nov. 7, 2006

(54) ANIMAL WRAP FOR TOUCH TRAINING

(76) Inventors: Pamela L. Wanveer, 8818 First Ave., Silver Spring, MD (US) 20910; Damion Hunter, 18510 Barnsville Rd., Barnsville, MD (US) 20838

( * ) Notice: Subject to any disclaimer, the term of this patent is extended or adjusted under 35 U.S.C. 154(b) by 162 days.

(21) Appl. No.: 10/942,863

(22) Filed: Sep. 17, 2004

(65) Prior Publication Data

US 2005/0072377 A1  Apr. 7, 2005

Related U.S. Application Data

(60) Provisional application No. 60/508,869, filed on Oct. 7, 2003.

(51) Int. Cl.
*A01K 27/00* (2006.01)

(52) U.S. Cl. .................. 119/792; 119/725; 119/856

(58) Field of Classification Search .............. 119/725, 119/726, 809–811, 814, 816–818, 820, 792–793, 119/856, 863, 865; D30/151–152; 54/28, 54/58; D24/189; 128/869, 875, 876; 602/60, 602/61, 75; 604/304
See application file for complete search history.

(56) References Cited

U.S. PATENT DOCUMENTS

| | | | | |
|---|---|---|---|---|
| 2,187,021 A | * | 1/1940 | Everson | 119/792 |
| 2,534,727 A | * | 12/1950 | Moyle | 54/71 |
| 3,769,939 A | | 11/1973 | Wais et al. | 119/856 |
| 4,483,275 A | | 11/1984 | DeGroot | 119/793 |
| 4,566,255 A | | 1/1986 | DeGroot | 54/24 |
| 4,693,241 A | * | 9/1987 | Trznadel | 602/62 |
| RE32,547 E | | 11/1987 | Reed et al. | 119/702 |
| 5,329,885 A | * | 7/1994 | Sporn | 119/864 |
| 5,370,083 A | | 12/1994 | Sporn | 119/864 |
| 5,511,515 A | | 4/1996 | Brown et al. | 119/771 |
| 5,676,093 A | | 10/1997 | Sporn | 119/792 |
| 5,769,030 A | | 6/1998 | Acoff | 119/712 |
| 5,791,295 A | | 8/1998 | Schmid et al. | 119/793 |
| 5,992,352 A | | 11/1999 | Borchelt et al. | 119/856 |

(Continued)

FOREIGN PATENT DOCUMENTS

EP  1 216 614 A2  6/2002

OTHER PUBLICATIONS

C. J. Puotinen, "It's a Wrap!", Dec. 6, 2002, published in Whole-Dog-Journal.com.

*Primary Examiner*—Teri Pham Luu
*Assistant Examiner*—Kimberly S. Smith
(74) *Attorney, Agent, or Firm*—Richard C. Litman

(57) ABSTRACT

The animal wrap for touch training is a combination of a front body portion harnessing the lower neck, forelegs, and the chest, and a rear body portion that has rear leg loops. The two wrap segments can be joined to each other by hook and loop fastening, and the leg loops are wrapped around the forelegs and hind legs and secured by hook and loop fastening material. No leash is used, as touch training is designed to apply gentle pressure to the animal's body. The front and rear portions are made from elastic fabric. The animal wrap kit includes a tail wrap and a face wrap in addition to the body portions. The face wrap is wrapped around on the head or face to bring awareness to the head region. The tail wrap is worn to either raise or lower a tail and bring awareness to the rear region of the animal.

18 Claims, 10 Drawing Sheets

U.S. PATENT DOCUMENTS 6,454,735 B1 * 9/2002 Hamada ..................... 602/61
6,463,888 B1 * 10/2002 Clark ......................... 119/856
6,595,156 B1   7/2003 Curran ....................... 119/792
2004/0244725 A1 * 12/2004 Hartman et al. ............ 119/856

* cited by examiner

| | A | B | C | D | E | F | G | H |
|---|---|---|---|---|---|---|---|---|
| 1 | Wrap Size Chart | XXS - Custom | X - Small | Small | Medium | Large | X - Large | XXL - Custom |
| 2 | Weight | less than 5 lbs. | 5-15 lbs. | 15-25 lbs. | 25-50 lbs. | 50-75 lbs. | 75-100 lbs. | over 100 lbs. |
| 3 | Neck Piece - doubled / total | custom | 13" / 26" | 17" / 34" | 24" / 48" | 28" / 56" | 32" / 62" | custom |
| 4 | Chest Piece | custom | 3" | 7" | 9" | 10" | 14" | custom |
| 5 | Torso / Foreleg Piece | custom | 11" | 15" | 20" | 25" | 27" | custom |
| 6 | Back & Leg Piece - folded / total | custom | 12.5" / 25" | 20" / 40" | 27.5" / 55" | 32.5" / 65" | 35" / 70" | custom |
| 7 | Torso Fastener - Top | custom | (N.A. - single piece with the leg fastener) | 2.5" | 4.5" | (2 pieces | (2 pieces | custom |
| 8 | Torso Fastener - Bottom | custom | | 4" | 5.5" | 2" X 3") | 2" X 4") | custom |
| 9 | Back / Leg Fold to Top of Torso Fastener | custom | | 1" | 2" | 3" | 3" | custom |
| 10 | Leg Fastener - Top | custom | 2" | 4" | 5.5" | 8" | 10" | custom |
| 11 | Leg Fastener - Bottom | custom | 3" | 5.5" | 7" | 10" | 12" | custom |
| 12 | Back / Leg Fold to Top of Leg Fastener | custom | 2" | 3" | 5" | 7" | 9" | custom |
| 13 | Extension Strips | 2" | 2" | 4" | 4" | 6" | 6" | 6" |

Fig. 5

ANIMAL WRAP FOR TOUCH TRAINING

CROSS-REFERENCE TO RELATED APPLICATION

This application claims the benefit of U.S. Provisional Patent Application Ser. No. 60/508,869, filed Oct. 7, 2003.

BACKGROUND OF THE INVENTION

1. Field of the Invention

The present invention relates generally to animal harnesses, and more particularly to a wrap for an animal's body designed especially for use with the process of touch training.

2. Description of the Related Art

Touch training has been used by animal trainers to treat animal behaviors ranging from overactive and aggressive to shy and introverted. In order to touch train an animal a person is required to wrap the body in a specific manner using constrictive wear made of elastic fabrics, such as bandages or shirts. The constrictive wear soothes and comforts the shy, introverted animal and tends to tame an overactive animal. The traditional way to wrap animals is to use ACE™ bandage wraps and pin them to the body of the animal. Frequently owners new to the technique of wrapping find the bandages fall, shift or move, making the process of securing the wraps in the proper position difficult. A wrap for touch training is therefore desired that is configured for immediate use.

The related art of interest describes various dog harnesses, but none discloses the present invention used for touch training of an animal without a leash, reins, or other tether. The relevant art of interest will be discussed in the order of perceived relevance to the present invention.

C. J. Puotinen in a 4-page article entitled "It's a Wrap!", published by Whole-Dog-Journal.com, on Dec. 6, 2002, describes body wrapping of dogs to calm and focus dogs. The various body wraps described are a T-shirt wrap and elastic bandage wraps such as a half-body wrap, full-body wrap, and an anxiety wrap. None of the elastic bandage wraps resemble or suggest the structure of our invention requiring separable body portions and a tail portion. In the full body dog wrap described by Puotinen, the front and back portions are secured to each other by safety pins, and each leg loop is secured by safety pins as well. The pins require some manipulation, and the body wrap tends to slip off and is not secured snugly, consequently not applying the pressure desired in touch therapy.

U.S. Pat. No. 3,769,939 issued on Nov. 6, 1973, to Lowell Wais et al. describes a restraining and training harnessing device comprising a cord leash attached to a harness consisting of elastic cords around the dog's neck and crossing its neck to encircle the forelegs. The dog is prevented from making any movement when the harness is pulled to draw the legs together. The device is distinguishable for being limited to the front legs and requiring a leash.

U.S. Reissue Pat. No. Re. 32,547 reissued on Nov. 24, 1987, to Robert C. Reed describes an exercising harness requiring a leash for dogs, horses and the like animals comprising a chest harness connected by elastic cords to the hocks of the rear legs. The harness is distinguishable for requiring a leash and rear leg attachments.

U.S. Patent Publication 2002/0073936, published on Jun. 20, 2002, describes a training device. The device is worn on either elongated muzzles or brachiocephalic muzzles. The device replaces collars and guides a dog by applying pressure to its head.

U.S. Pat. No. 5,769,030 issued on Jun. 23, 1998, to Marcus L. Acoff describes a dog training and conditioning apparatus comprising a collar, a back strap attached to the collar, and a chest strap attached to the collar and to a weighted vest having an upper and lower portion. The chest strap is also provided with weights. The apparatus is distinguishable for requiring the addition of weight to the chest strap and the vest.

U.S. Pat. No. 5,329,885, issued on Jul. 19, 1994, U.S. Pat. No. 5,370,083, issued on Dec. 6, 1994, and U.S. Pat. No. 5,676,093, issued on Oct. 14, 1997, to Joseph S. Sporn describe leash controllable dog training harnesses. In these devices, a harness includes a pair of loops crossing the dog's chest and attached to a leash in the '885 patent, a harness around the chest attached to straps on the front legs in the '083 patent, and a harness around the neck and between each front leg in the '093 patent. The devices are distinguishable for requiring a leash to control the animal, and straps between the front legs traversing the animal's chest.

U.S. Pat. No. 5,791,295 issued on Aug. 11, 1998, to Linda A. Schmid et al. describes a dog training leash including a neck band and a chest band connected on the back by a leash. The device is distinguishable for requiring a leash and bands for the neck and chest.

U.S. Pat. No. 5,992,352 issued on Nov. 30, 1999, to Peter L. Borchelt et al. describes a dog halter comprising an interconnected neck, side and cheek straps. The dog halter is distinguishable for requiring a neck strap interconnected with side and cheek straps.

Other halters or harnesses are disclosed in U.S. Pat. No. 4,483,275, issued to A. A. DeGroot on Nov. 20, 1984; U.S. Pat. No. 4,566,255, issued to A. A. DeGroot on Jan. 28, 1986; U.S. Pat. No. 5,511,515, issued to D. D. Brown et al. on Apr. 30, 1996; U.S. Pat. No. 5,769,030, issued to M. L. Acoff on Jun. 23, 1998; European Patent Number 1,216,614, published on Jun. 26, 2002; and U.S. Pat. No. 6,595,156, issued to R. E. Curran on Jul. 22, 2003 (halter secure to front of dog's head).

None of the above inventions and patents, taken either singly or in combination, is seen to describe the instant invention as claimed. Thus, an animal wrap for touch training solving the aforementioned problems is desired.

SUMMARY OF THE INVENTION

The animal wrap for touch training encourages an animal's sensory input and brings about a better mind-and-body connection. The use of the animal wrap results in teaching the animal to maintain a constant physical awareness because the wrap moves with the animal's body. The animal wrap mainly aids the animal's balance and focus. Shy, timid or fearful animals become more secure after training with the wrap. Other benefits are as follows: (1) there is more movement and engagement throughout the animal's hindquarters; (2) improvement in the animal's gait coordination and flexibility, such as an uneven stride; and (3) lessening the animal's fear of loud noises and increasing its confidence. The wrap does this by applying gentle pressure to the animal's body.

The animal wrap can be furnished as individual components for separate and independent use, or in various combinations as a kit having up to four components: a front body wrap portion, a rear body wrap portion, a tail wrap and a face wrap. The basic animal wrap includes either a front body wrap portion or a rear body wrap portion or both. The front body wrap portion is wrapped around the animal's forelegs and the rear body wrap portion is wrapped around the animal's hind legs. The rear body portion can be attached to the front body portion by one or more straps extending between the two which are removably fastened together with hook and loop fastening material, or by any other removably securable type of strap. The front body wrap portion and the rear body wrap portion are each made from elastic fabric, such as elastic bandage wraps. Both the front body wrap portion and the rear body wrap portion have straps that form loops near or around the legs that are then fastened to the main body of the front and rear portions, respectively, by hook and loop fastening material.

The tail wrap is used specifically for wrapping the animal's tail, either elevating or lowering the animal's tail, and the head wrap is used for wrapping the animal's head and mouth area. The tail wrap is used with either the front body wrap portion or the rear body wrap portion, while the head wrap and the front body wrap portion and the rear body wrap portion can be used independently or together as based on the instructor's judgment. The tail wrap is used to hold a shy introverted animal's tail up and used to hold an aggressive animal's tail down. The tail wrap is a strip of bandage having two ends with hook and loop fastening material disposed at its ends. The tail wrap is wrapped around the middle point of the tail with the ends being secured to the rear body portion.

The head wrap is designed to bring awareness to the head/face area, to help calm barking (when the animal is a dog) and other mouthing behavior. The head wrap is formed from an elastic band having hook and loop fastening patches on its ends. The head wrap is shaped as a figure eight. It is placed on the area between the nose and mouth, crosses under the jaw or chin and stretches up over the neck adjacent the ears, where it is finally fastened behind the animal's ears.

Accordingly, it is a principal object of the invention to provide an animal wrap for touch training that can be securely maintained on the animal's body, head or tail.

It is another object of the invention to provide a front animal body wrap segment for touch training made of joined elastic webbed bandage strips or other elastic fabric and an animal's head wrap and tail wrap made from one such strip.

It is a further object of the invention to provide a rear animal body wrap segment for such training made of joined elastic webbed bandage strips.

Still another object of the invention is to provide an animal's head wrap portion and a tail wrap portion for touch training made of a webbed bandage strip.

Yet another object of the invention is to provide an animal wrap for touch training having an animal's front body wrap segment connected to a rear body wrap segment.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a table of the measurements of the parts of the front and rear body portions of an animal wrap of the present invention for various sizes of animals.

Similar reference characters denote corresponding features consistently throughout the attached drawings.

DETAILED DESCRIPTION OF THE PREFERRED EMBODIMENTS

Figure 1:
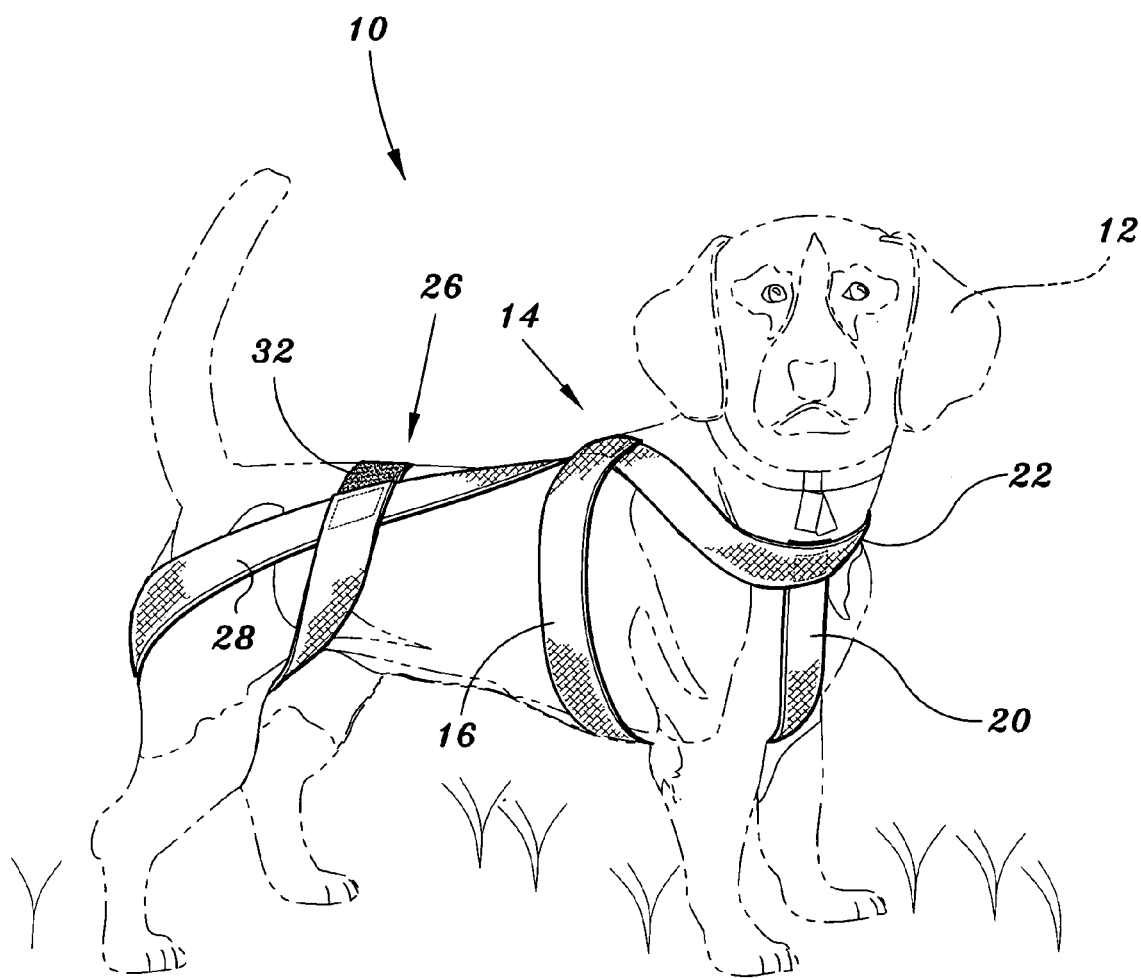
FIG. 1 is an environmental, perspective view of a dog wearing an animal body wrap for touch training according to the present invention.

The present invention is directed to an animal wrap made especially for touch training. Referring to FIGS. 1–4, an embodiment of the animal wrap 10 is shown worn around a body of a dog 12; however, it will be understood that a wrap 10 of the proper size can be used on any other type of animal having forelegs and hind legs. The wrap 10 has a front body wrap portion 14 and a rear body wrap portion 26. The wrap 10 is characterized by utilizing one-half inch to five inch wide elastic webbing having hook and loop fastening patches for securing the wrap 10 to the animal's body. The front 14 and rear 26 portions are made from elastic fabric, such as elastic bandage wraps or ACE™ bandage wraps.

Figure 2:
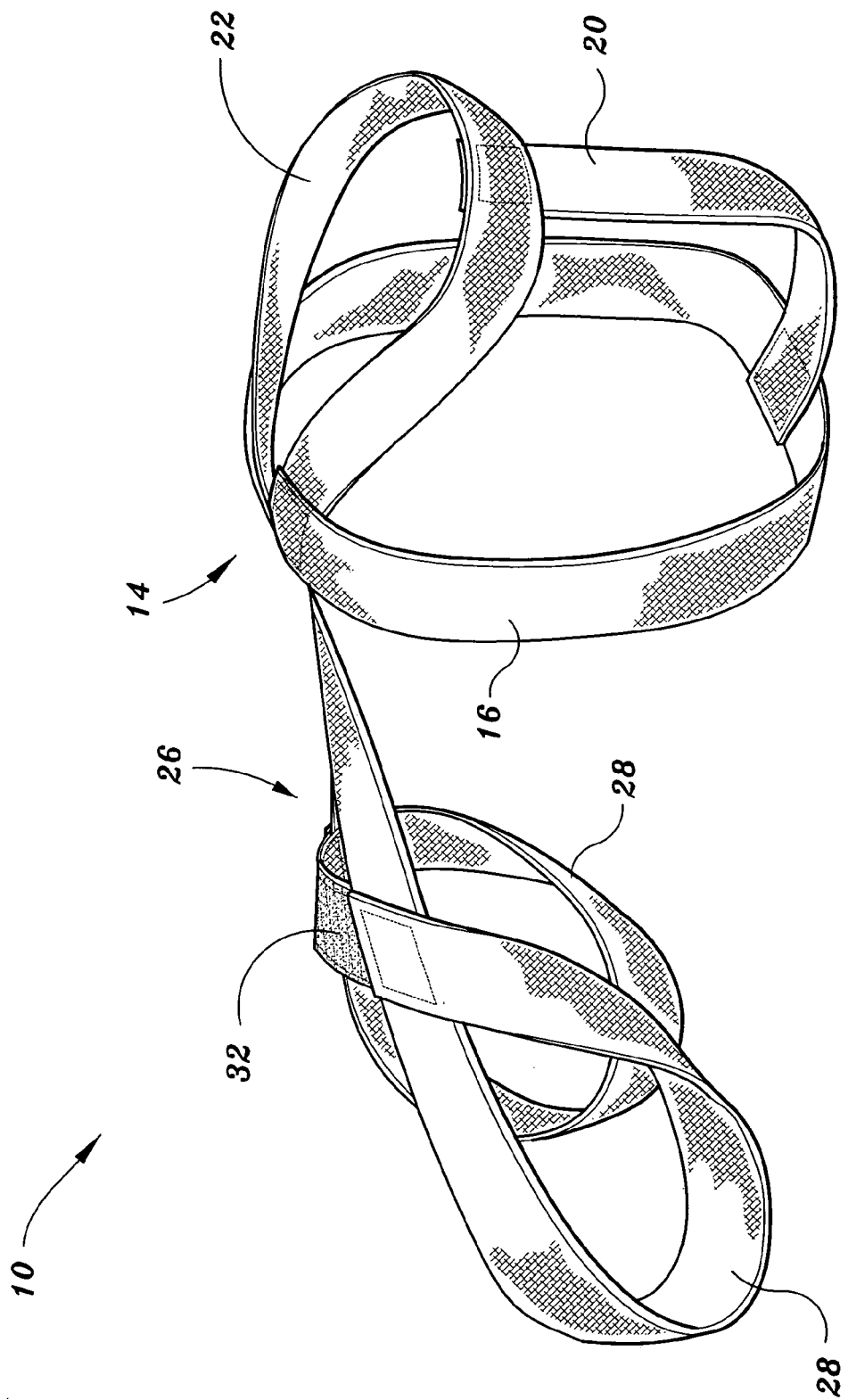
FIG. 2 is a perspective view of the animal wrap of the present invention showing the front and rear portions attached to each other.
Figure 4:
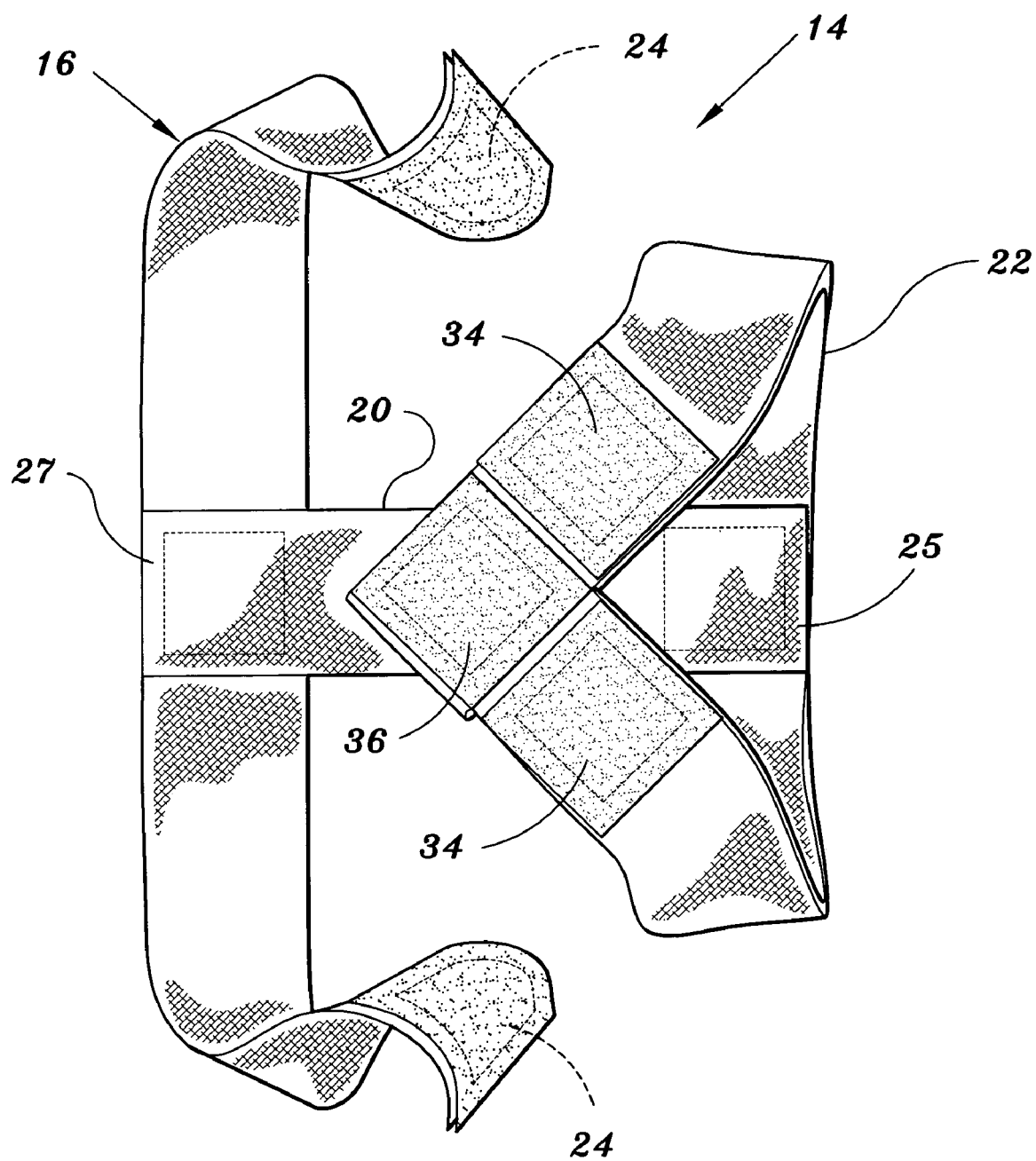
FIG. 4 is a perspective view of the front portion of the animal wrap according to the present invention.

Referring to FIGS. 2 and 4, the front body wrap portion 14 comprises a neckpiece 22, a chest strap 20 and a foreleg strap 16. The neckpiece 22 is formed by an elongate elastic band having opposite ends that is doubled over into two layers and stitched together at the ends to form a neck loop. The ends of the neckpiece 22 are not butted together end to end, but are overlapped at right angles to each other and stitched together. By layering or doubling the elastic bands used to form the neckpiece 22, the neck loop is less likely to stretch extensively and lose its shape as it is worn by the animal. An end patch 36 of hook and loop fastening material is stitched over the overlapping ends of the neckpiece 22 on the exterior surface of the loop. A pair of hook and loop foreleg patches 34 are stitched to the neckpiece 22 adjacent the end patch 36.

The chest strap 20 is an elongated band having two ends 25 and 27, respectively. End 25 of the chest strap 20 is stitched to the neckpiece 22, being 180° opposite the end patch 36. End 27 of the chest strap 20 bisects the foreleg strap 16. The foreleg strap 16 is formed by stitching together two elastic bands. The foreleg strap 16 has two ends 24 with hook and loop fastening material disposed on the interior surfaces of the ends 24.

The front body wrap portion 14 is positioned onto the dog by placing the neckpiece 22 over the dog's head and around the dog's neck. Then the chest piece 20 is extended between the dog's forelegs, whereby ends 24 of the foreleg strap 16 are wrapped up around the dog's body behind the forelegs and fastened to corresponding hook and loop foreleg patches 34.

Figure 3:
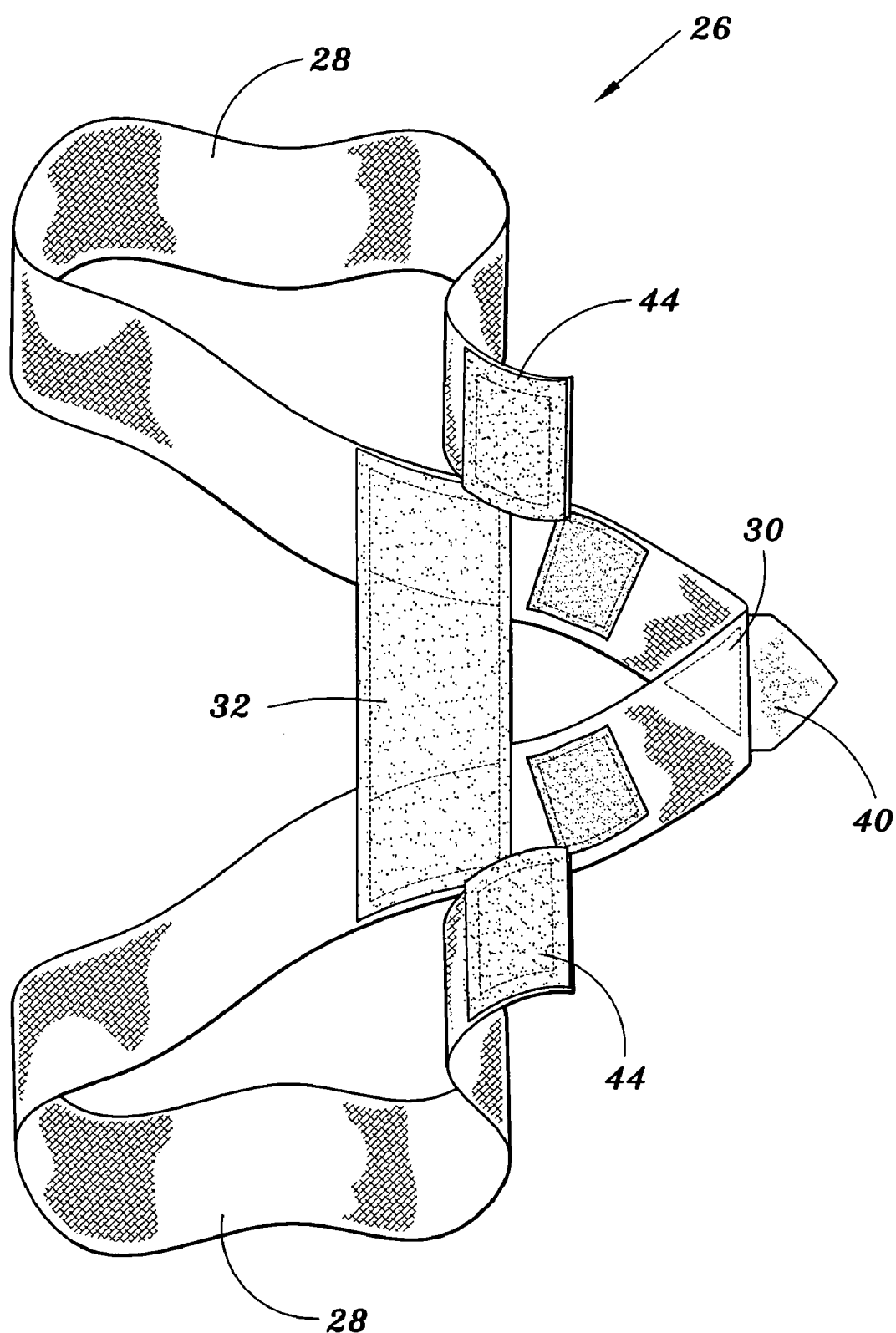
FIG. 3 is a perspective view of the rear portion of the animal wrap according to the present invention.

Referring now to FIGS. 2 and 3, the rear body wrap portion 26 is a V-shaped body made of at least one elastic band and having an interior and an exterior surface. The rear body wrap portion 26 has an overlapping junction end 30 forming the apex of the V-shaped body and two leg pieces 28 extending from the apex. The two leg pieces 28 are equal in length and have ends opposite junction end 30. The rear body wrap portion 26 is formed by overlapping and stitching together two strips of elastic bandages at the junction end 30 to form a V-shape configuration. Another way to form the rear body wrap portion 26 is to fold a long elastic band at its midpoint and stitch the fold together to form the junction end 30. The junction end 30 is reinforced by a junction patch 40 of hook and loop fastening material attached to the interior surface of the rear body wrap portion 26. The junction patch 40 is releasably attached to the end patch 36 of the front body wrap portion 14 to connect the two and form the animal wrap 10.

As mentioned above, the ends of the leg pieces 28 are opposite the junction end 30, which forms the apex of the V-shape junction. Disposed at each end of the leg pieces 28 are hind leg patches 44. The hind leg patches 44 are made of hook and loop material and are disposed on the interior surface of the ends on the rear body wrap portion 26. A crosspiece strap is connected between the two leg pieces 28 adjacent the junction end 30. The crosspiece strap has a crosspiece patch 32 of hook and loop fastening material attached to its exterior surface.

To form the wrap 10, the rear body wrap portion 26 is strapped on the dog 12 by attaching the junction patch 40 to the end patch 36 of the front body wrap portion 14. Then, each leg piece 28 is extended rearwardly across the dog's back, down around the dog's hind legs and brought forward between the hind legs to be finally pulled up to the dog's back, where hind leg patches 44 are releasably attached to the crosspiece patch 32.

The animal wrap 10 is shown in the figures as a full body wrap using both the front portion 14 and the rear portion 26. However, each piece can be used individually as a half-body wrap, using only the front body portion 14 or only the rear body portion 26. Hook and loop fastening 44, 24 disposed at ends on the leg pieces 28 and foreleg strap 16, respectively, and hook and loop fastening material 36, 40 used to connect the front portion 14 to the rear portion 26, respectively, are easier and more convenient than using pins, and also result in a more secure snug fit to the dog 12, thereby ensuring the application of gentle pressure to the dog's body, as desired.

Figure 7:
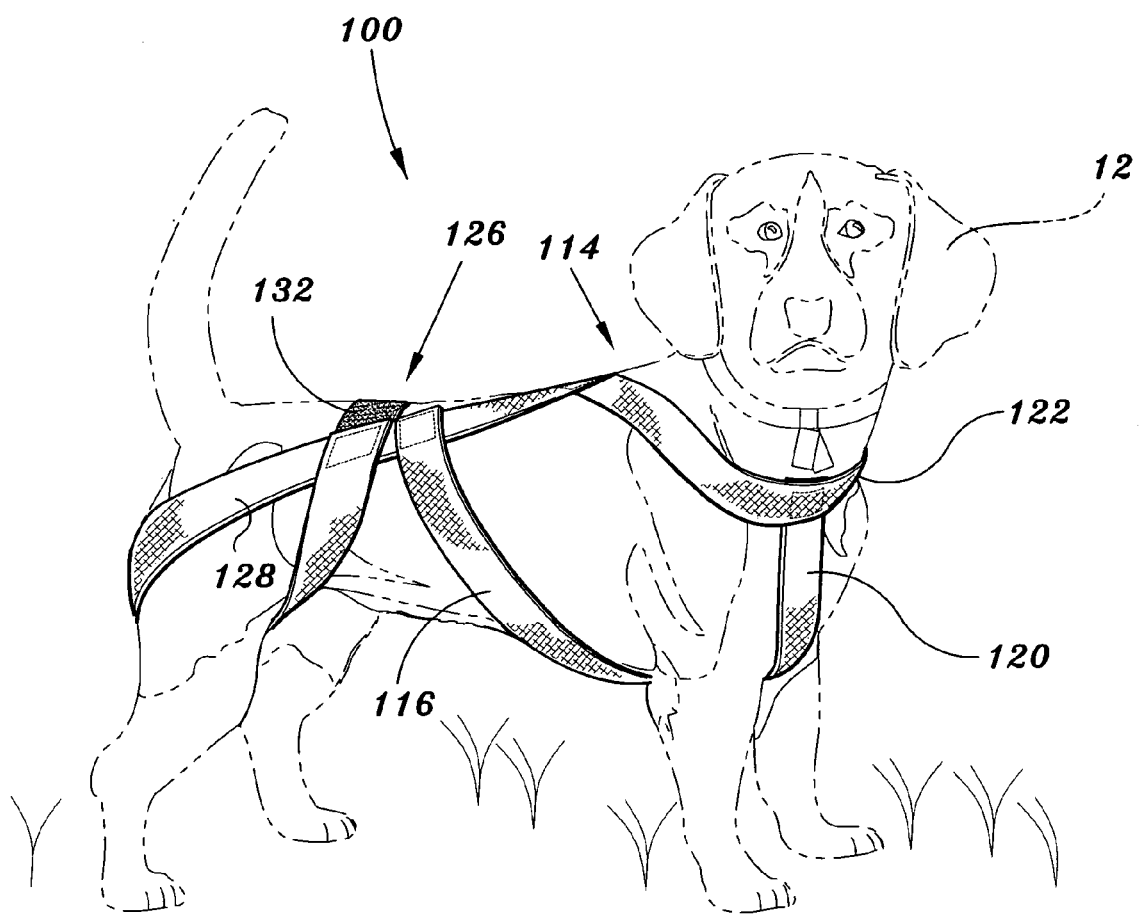
FIG. 7 is an environmental, perspective view of a dog wearing an alternative embodiment of the animal wrap for touch training.
Figure 8:
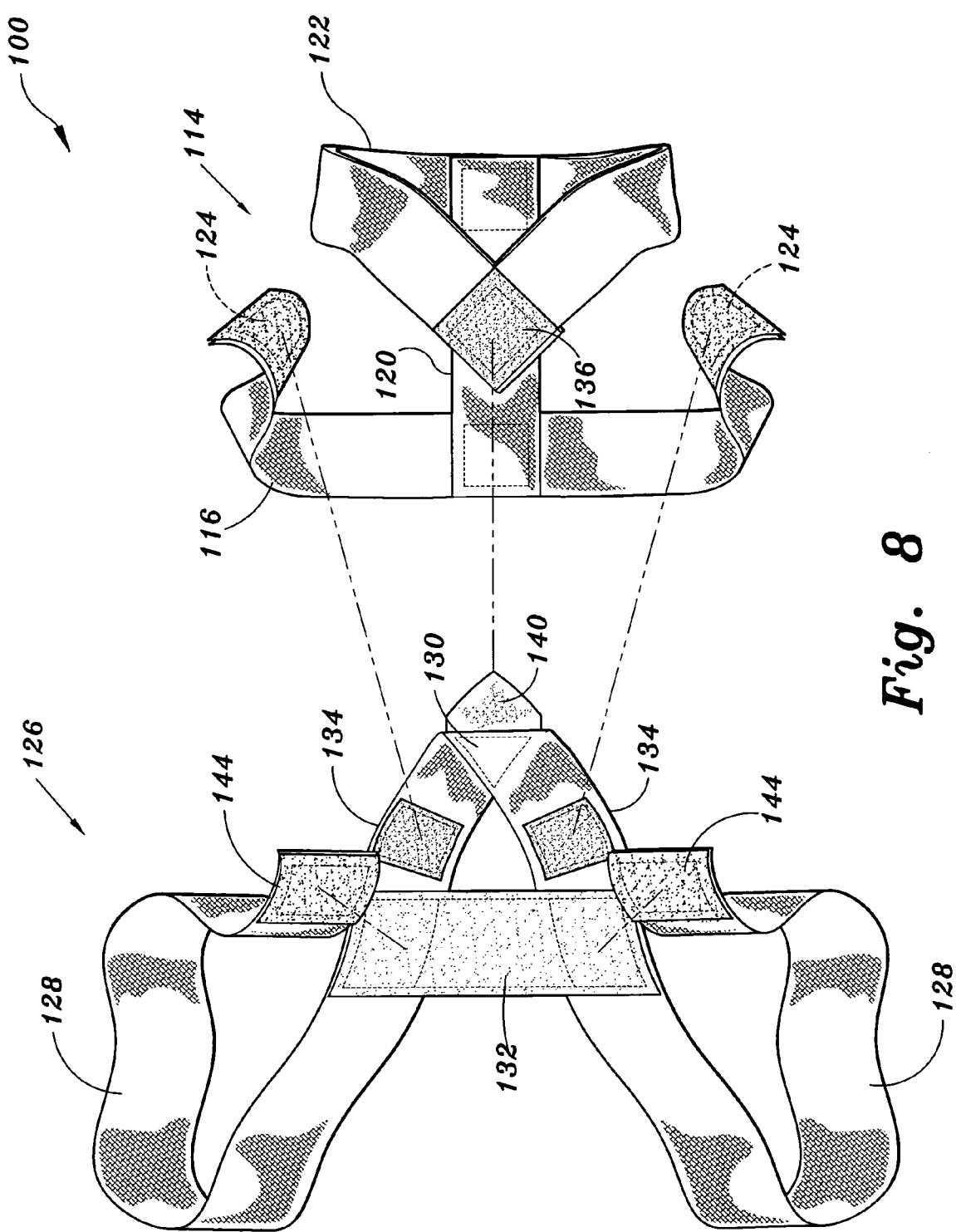
FIG. 8 is a perspective view of the animal wrap of FIG. 7 showing the front and rear portions exploded from each other.

There are a number of ways to configure the wrap 10. The key area is to target the area around the forelegs where tension builds up. Swaddling the animal in this way gives the animal more self-confidence. Thus, FIGS. 7 and 8 show wrap 100, being an alternative embodiment to wrap 10, and which provides an alternative way to swaddle the animal. Wrap 100 has a front body wrap portion 114 and a rear body wrap portion 126. Here, ends 124 of the foreleg strap 116 attach to the rear body wrap 126. Specifically, ends 124 attach to hook and loop fasteners 134 that are disposed between crosspiece patch 132 of hook and loop material and the apex 130 of the V-shaped rear body wrap portion 126. End patch 136 is used to accommodate junction patch 140 of the rear body wrap portion 126 when forming wrap 100.

Wrap 100, like wrap 10, may be used as separate components, so that the front body wrap portion 114 may be used alone without the rear portion 126. In this instance, both the ends 124 of the foreleg strap 116 are secured to the end patch 136. For wrap 10, the ends 24 of the foreleg strap 16 are simply attached to the hook and loop foreleg patches 34. When the rear body wrap portion 26 or 126 is used alone, the junction patch 40, 140 is placed and held on the back of the animal so that the leg pieces 28 or 128 are drawn around the hind legs to secure the hind leg patches 44 o 144 to the crosspiece patch 32 or 132, respectively.

Additional pieces may be used with either wrap 10 or wrap 100, such as an extension strip, or appendage wraps 41, 150. The extension strip (not shown) is a length of hook and loop material used to extend the distance between corresponding hook and loop material at certain points on the wrap 10, 100. For example, the extension strips are used to extend the distance between the front 14, 114 and rear body wrap portions 26, 126 for animals that have an extended torso wherein the junction patch 40, 140 is prevented from directly securing to the end patch 36, 136. Also the extension strip may be used between the ends 24, 124 of the foreleg strip 16, 116 and its corresponding patch, either hook and loop foreleg patch 34, 134 or end patch 36, 136, as well as between the ends 44, 144 of the leg pieces 28, 128 and the crosspiece patch 32, 132.

Figure 6:
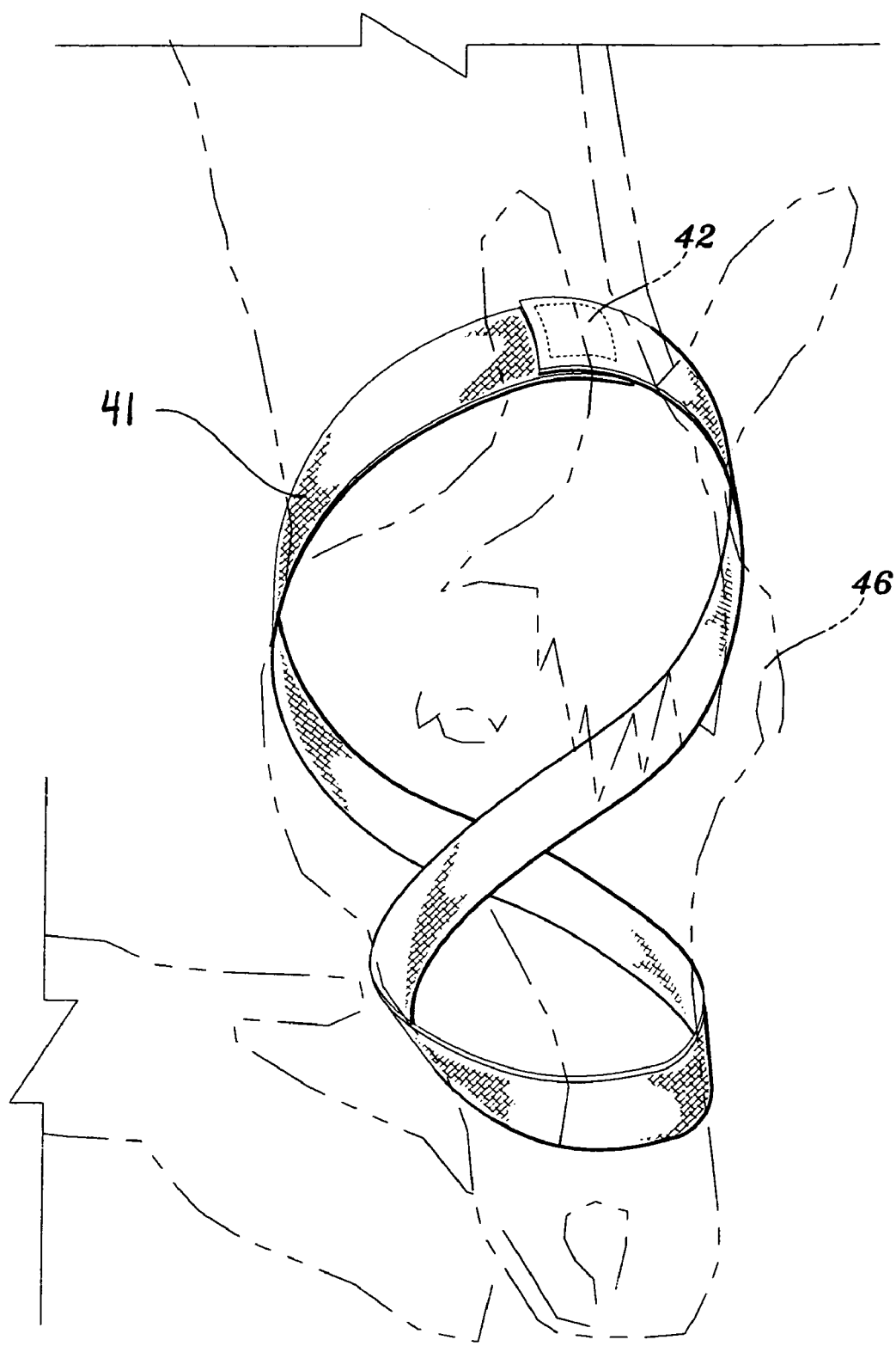
FIG. 6 is a front perspective view of a head wrap worn on a horse's head.
Figure 9:
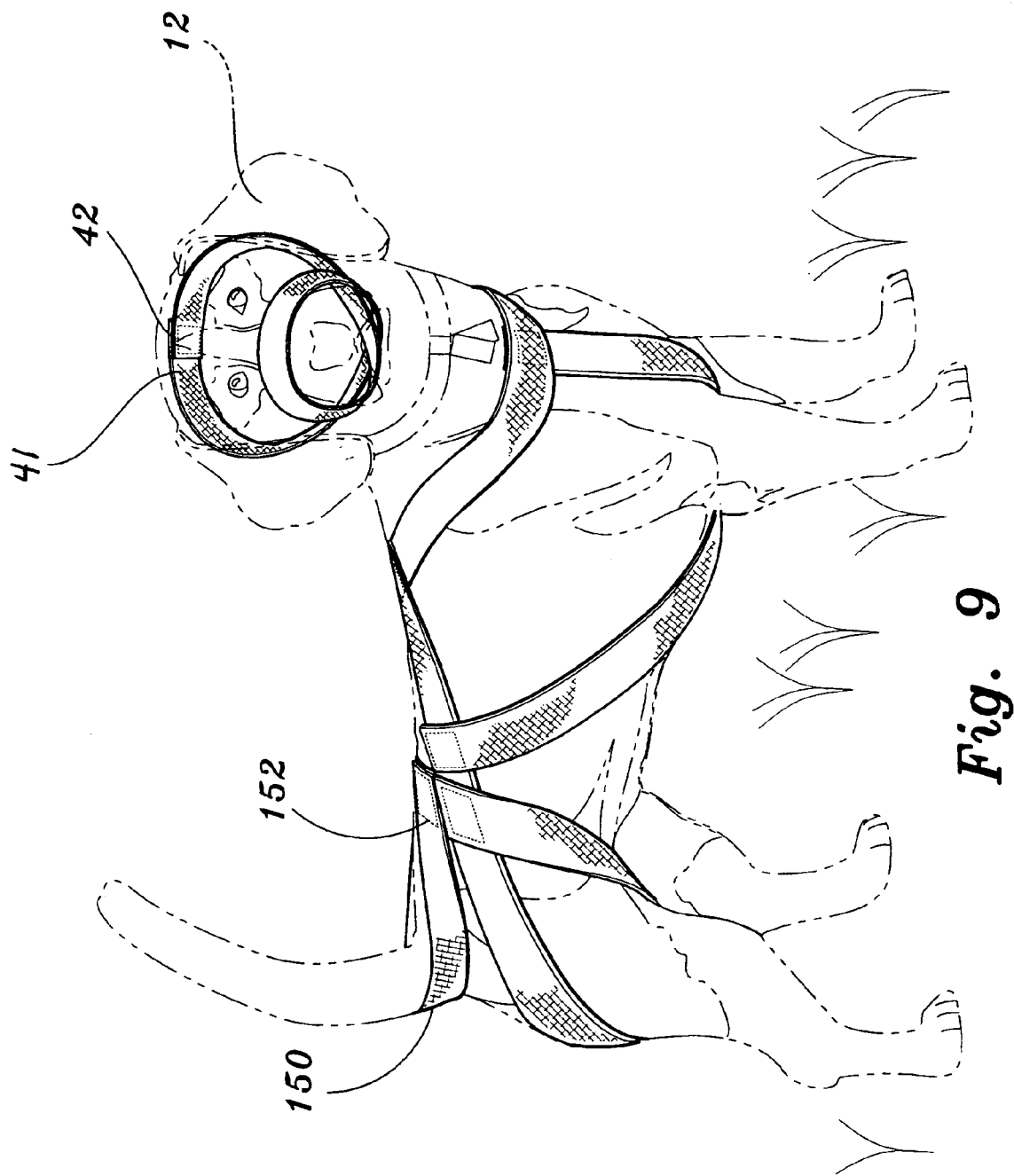
FIG. 9 is a perspective view of a tail wrap and head wrap worn with the animal wrap of FIG. 7.
Figure 10:
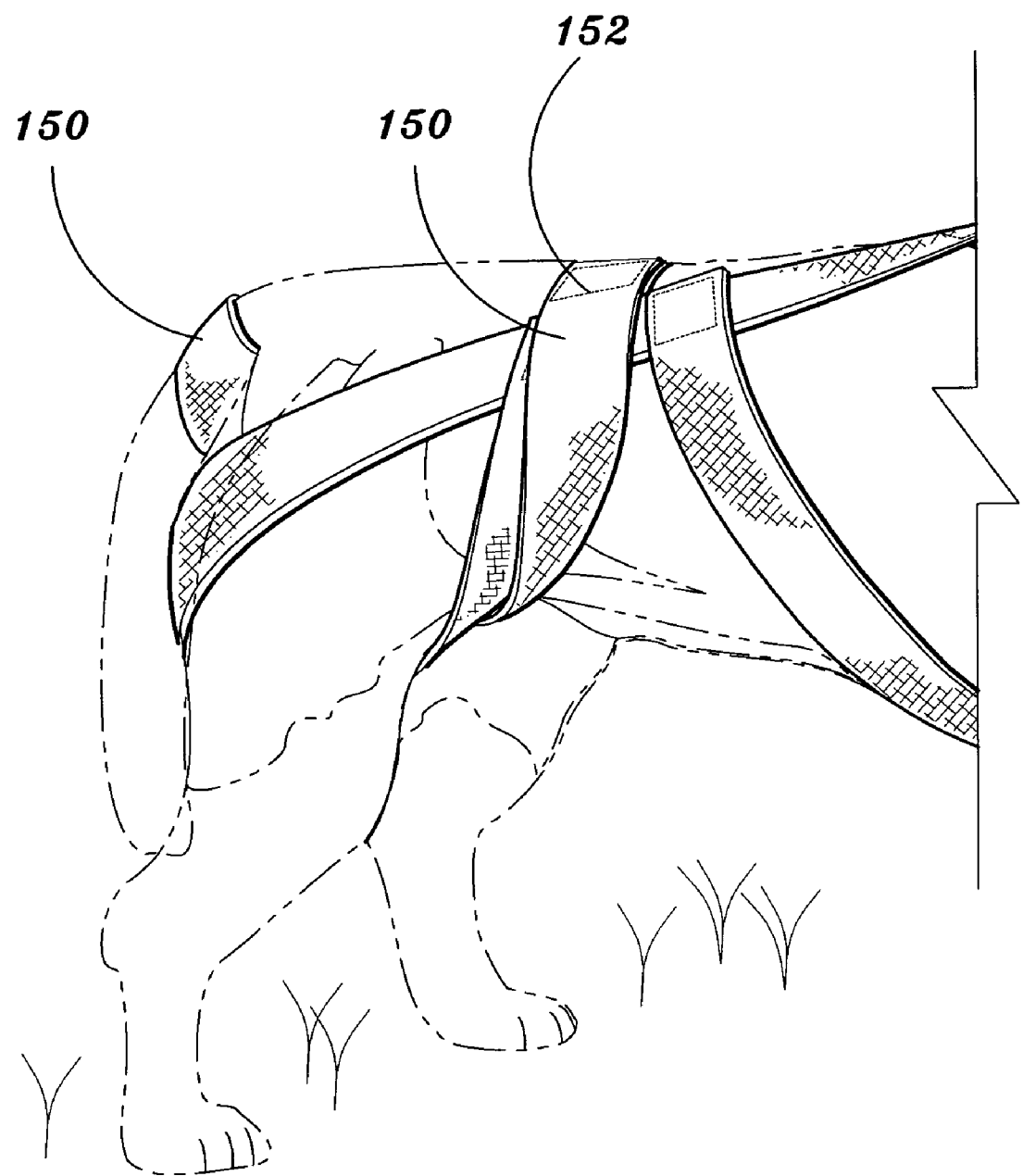
FIG. 10 is a perspective view of an alternative method of using the tail wrap for touch training according to the present invention.

Referring to FIGS. 6, 9 and 10, the appendage wraps 41, 150 comprise a tail wrap 150 having ends 152 and a face wrap 41 having ends 42. The appendage wraps 41, 150 are made of elastic bandage, and each have ends with hook and loop material. The tail wrap 150 is longer than the face wrap 41 and is designed to raise the animal's tail up or keep the animal's tail down, as shown in FIGS. 9 and 10, respectively. As shown in FIG. 9, the midpoint of the tail wrap 150 is wrapped around the tail of the dog 12 with ends 152 being brought up to the animal's back and secured to the crosspiece patch 32 or 132 of hook and loop material. The crosspiece patch 32 or 132 is of a sufficient length that it can hold both the ends 44 or 144 of the leg straps 28 or 128, respectively, and the ends 152 of the tail wrap 150.

Looking now to FIG. 10, the tail wrap 150 is shown used to keep the tail down. Here the midpoint of the tail wrap 150 is wrapped around the tail of the dog 12, but now the ends 152 are brought down under the animal's body around the hind legs and finally secured to the crosspiece patch 32 or 132. As an alternative, instead of securing the tail wrap 150 to the rear body wrap portion 26, 126 the tail wrap 150 may be secured to the end patch 36, 136 or the foreleg patches 34 of the front body wrap portion 14, 114. The tail wrap 150 should be used for a short period of time and should not interfere with normal body functions of the animal.

Referring back to FIG. 9, the head wrap 41 is shown on the dog 12. The head wrap 41 is a simple head or face wrap formed using a strip of elastic fabric with hook and loop fastening patches 42 at its ends. The head wrap 41 is shorter than the tail wrap 150. The head wrap 41 is wrapped around the face and head in a figure eight by placing the midpoint of the head wrap 41 down on the nose, crossing the wrap 41 under the chin and securing the ends 42 behind the ears. The head wrap 41 is used to bring awareness to the animal's face and mouth area. The animal has full use of its mouth. This loose head wrap 41 can also be used for a horse 46, as shown in FIG. 6.

The rationale for the head wrap 41 resides in stimulating the relaxation-promoting parasympathetic nervous system, which quiets the sympathetic nervous system to eliminate the "fight, fight or freeze" response and relieve any stress. Touching of the animal's face helps to release the animal's endorphins to induce calming and soothing of the animal.

The head wrap 41 can be used as a first step when introducing head collars on dogs. A head wrap is very useful for animals that are noise sensitive. For example, if a head wrap is attached to the dog or horse before a thunderstorm, a Fourth of July celebration involving fireworks, or other event in which loud noises are produced, many animals have been found to have less tension when coping with other loud noises.

Referring now to FIG. 5, the table 38 enumerates sizes for the wrap 10, 100. The wrap 10, 100 can be made to fit any size animal as displayed by sizes XXS-Custom in column B to size XXL-Custom in column H. Each size has specific dimensions for the wrap 10, 100. For instance, an animal weighing about 15–25 pounds would have the wrap 10, 100 made according to the dimensions in column D designated as SMALL.

The front body wrap portion 14, 114 may have a neckpiece 22, 122 that is a single 17" strip or a single 34" strip that is folded in half and sewn together to form a doubled 17" piece. The chest piece 20, 120 that extends from the neckpiece 22, 122 is 7" long while the foreleg piece 16, 116 is 15" long. The rear portion 26, 126, if made from a single strip of bandage, is a 40" long strip of bandage that is folded into a "V" to have 20" long legs, as indicated in row 6 of the table 38 in FIG. 5.

Although the table 38 provides dimensions for both wraps 10, 100, row seven, "Torso Fastener-Top", row eight, "Torso Fastener-Bottom", and row nine, "Back/Leg Fold to Top of Torso Fastener", all refer to the placement of hook and loop patch 134 on the second wrap embodiment 100. Row seven, "Torso Fastener-Top" indicates the distance from the junction end 130 to the top of the hook and loop fasteners 134, as measured along the side of the rear portion 126; row eight, "Torso Fastener-Bottom", indicates the distance from the junction end 130 to the bottom of the hook and loop fasteners 134. Row nine shows that the 1" measurement for placing hook and loop fasteners 134 on the rear body portion 126 is taken from the center of end 130 straight down each leg 128.

The positioning of the hook and loop fasteners 134 determines the angle at which the torso strap (foreleg strap 116) may grasp the animal's body as it attaches to the rear portion 126. The hook and loop fasteners 134 can be individual pieces on each leg or a single strip stretching from one leg 128 to the other leg 128 on the rear portion 126.

Rows ten ("Leg Fastener-Top"), eleven ("Leg Fastener-Bottom), and twelve (Back/Leg Fold to Top of Leg Fastener) indicate the position of the crosspiece patch 32, 132 for both wraps 10, 100. Row ten refers to the measurement between the top edge of the crosspiece patch 32, 132 and the junction end 30, 130 taken along the side edge of the rear wrap 26, 126. Row eleven refers to the measurement between the bottom edge of the crosspiece patch 32, 132 to the junction end 30, 130, again taken along the side edge of the rear wrap 26, 126. Row twelve is the measurement from the junction end 30, 130 or apex of the V-shaped rear wrap 26, 126 to the crosspiece patch 32, 132, which is where the ends of the hind leg straps 28 are attached. The crosspiece patch 132 must be placed at a specific location between the two 20" legs to obtain the precise angle defining the shape of the V. Generally, the placement of the crosspiece patch 132 determines the angle of the V shaped rear portion 26, 126 and allows the hind leg straps 28, 128 to be comfortably placed around the animal's body. Defining the appropriate angle for the V is essential to properly maintain the wrap 10, 100 on the animal. Finally, row thirteen of the table 38 gives the measurement of the extension strips, which, as described above, are lengthening pieces made of hook and loop material. For example, the extension strips for the SMALL wrap 10, 100 of column D are 4" long pieces.

It is to be understood that the present invention is not limited to the embodiment described above, but encompasses any and all embodiments within the scope of the following claims.

We claim:

1. An animal wrap for touch training, comprising:
    a front body wrap portion having:
        a neckpiece band having opposite ends overlapped at a right angle and fixed together to define a neck loop having an interior surface and an exterior surface;
        an end patch of hook and loop fastening material attached to the exterior surface of the loop over the overlapped ends of the neckpiece band;
        a chest strap having a first end fixed to the neck loop 180° opposite the end patch and having a second end;
        a foreleg strap fixed to and bisected by the second end of the chest strap and having opposite ends, an interior surface, and an exterior surface; and
        first and second patches of hook and loop fastening material attached to the interior surface of the foreleg strap at the opposite ends thereof.

2. The animal wrap according to claim 1, wherein the front body wrap portion is made from elastic fabric.

3. The animal wrap according to claim 1, further comprising a pair of foreleg patches of hook and loop fastening material attached to the exterior surface of the neck loop on opposite sides of the end patch, the first and second patches of the foreleg strap releasably mating with the pair of foreleg patches to define foreleg loops.

4. The animal wrap according to claim 1, further comprising a rear body wrap portion having:
    a V-shaped body having an interior and exterior surface made of at least one band having a junction end defining an apex of the V-shaped body, the body defining leg pieces extending from the junction end, the leg pieces having free ends;
    a junction patch of hook and loop fastening material attached to the interior surface of the junction end, the junction patch releasably mating with the end patch to connect the front body wrap portion with the rear body wrap portion;
    first and second hind leg patches of hook and loop fastening material attached to the interior surface of the leg pieces at the free ends, respectively; and
    a crosspiece strap extending between the leg pieces of the rear body wrap portion adjacent the junction end of the V-shaped body, the crosspiece strap having a crosspiece patch of hook and loop material attached thereto, the hind leg patches releasably mating with the crosspiece patch to define hind leg loops.

5. The animal wrap according to claim 4, wherein the rear body wrap portion is made from elastic bandage wraps.

6. The animal wrap according to claim 4, further comprising a pair of foreleg patches of hook and loop fastening material attached to the exterior surface of the leg pieces adjacent the crosspiece patch, the first and second patches of the foreleg piece releasably mating with the pair of foreleg patches to define foreleg loops.

7. An animal wrap for touch training, comprising:
    a rear body wrap portion having:
        a V-shaped body having an interior and exterior surface made of at least one band having a junction end defining an apex of the V-shaped body, the body defining leg pieces depending from the junction end, the leg pieces having ends;

a junction patch of hook and loop fastening material attached to the interior surface of the junction end;

first and second hind leg patches of hook and loop fastening material attached to the interior surface of the leg pieces at the ends, respectively; and a crosspiece strap extending between the leg pieces of the rear body wrap portion adjacent the junction end of the V-shaped body, the crosspiece strap having a crosspiece patch of hook and loop material attached thereto, the hind leg patches releasably mating with the crosspiece patch to define hind leg loops.

8. The animal wrap according to claim 7, wherein the at least one band consists of a single length of elastic fabric folded at a midpoint of the fabric to form the apex and the leg pieces of the V-shaped body.

9. The animal wrap according to claim 7, wherein the leg pieces of the rear body wrap portion are made from strips of elastic bandage of equal length, each strip having a first end and a second end, the first end of the strips being overlapped to form the junction end and second ends being free ends.

10. The animal wrap according to claim 7, wherein the rear body wrap portion is made from elastic fabric.

11. The animal wrap according to claim 7, further comprising a pair of foreleg patches of hook and loop fastening material attached to the exterior surface of the leg pieces adjacent the crosspiece patch, the first and second patches of the foreleg strap releasably mating with the pair of foreleg patches to define foreleg loops.

12. The animal wrap according to claim 7, further comprising a tail wrap, the tail wrap being an elastic bandage strip having ends and hook and loop fastening patches attached to the ends, the ends being removably secured to the crosspiece patch of the rear body wrap.

13. A method of using the tail wrap of claim 12, comprising the steps of:
  (a) placing a midpoint of the tail wrap around a tail of an animal;
  (b) wrapping the tail wrap around the tail; and
  (c) securing the ends of the tail wrap to the crosspiece patch.

14. The method of using the tail wrap according to claim 13, further comprising the step of pulling the ends of the tail wrap under the animal's body, around the hind legs, and then up towards the animal's back before step (c).

15. The animal wrap according to claim 7, further comprising a tail wrap, the tail wrap being an elastic bandage strip having ends possessing hook and loop fastening patches, the ends being removably secured to the end patch of the front body wrap.

16. A method of using the tail wrap of claim 15 comprising the steps of:
  (a) placing a midpoint of the tail wrap around a tail of an animal;
  (b) wrapping the tail wrap around the tail; and
  (c) securing the ends of the tail wrap to the crosspiece patch.

17. The method of using the tail wrap according to claim 16, further comprising the step of pulling the ends of the tail wrap under the animal's body, around the hind legs then up towards the animal's back before step (c).

18. An animal wrap kit for touch training, comprising:
  (a) a front body wrap portion having
    (i) a neckpiece band having opposite ends overlapped at a right angle and fixed together to define a neck loop having an interior surface and an exterior surface;
    (ii) an end patch of hook and loop fastening material attached to the exterior surface of the loop over the overlapped ends of the neckpiece band;
    (iii) a chest strap having a first end fixed to the neck loop 180° opposite the end patch and having a second end;
    (iv) a foreleg strap fixed to and bisected by the second end of the chest strap and having opposite ends, an interior surface, and an exterior surface; and
    (v) first and second patches of hook and loop fastening material attached to the interior surface of the foreleg strap at the opposite ends thereof;
  (b) a rear body wrap portion having:
    (i) a V-shaped body having an interior and exterior surface made of at least one band having a junction end defining an apex of the V-shaped body, the body defining leg pieces extending from the junction end, the leg pieces having ends;
    (ii) a junction patch of hook and loop fastening material attached to the interior surface of the junction end, the junction patch releasably mating with the end patch to connect the front body wrap portion with the rear body wrap portion;
    (iii) first and second hind leg patches of hook and loop fastening material attached to the interior surface of the leg pieces at the ends, respectively; and
    (iv) a crosspiece strap extending between the leg pieces of the rear body wrap portion adjacent the junction end of the V-shaped body, the crosspiece strap having a crosspiece patch of hook and loop material attached thereto, the hind leg patches releasably mating with the crosspiece patch to define hind leg loops;
  (c) a tail wrap, the tail wrap being a strip of elastic material having two ends and hook and loop fastening patches attached to the two ends; and
  (d) a face wrap, the face wrap being a strip of elastic material having two ends and hook and loop fastening patches attached to the two ends.

* * * * *